US008996922B2

(12) United States Patent
Li et al.

(10) Patent No.: US 8,996,922 B2
(45) Date of Patent: Mar. 31, 2015

(54) MIXED NUMERIC AND STRING CONSTRAINT ANALYSIS

(71) Applicant: Fujitsu Limited, Kawasaki-shi, Kanagawa (JP)

(72) Inventors: Guodong Li, San Jose, CA (US); Indradeep Ghosh, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/683,921

(22) Filed: Nov. 21, 2012

(65) Prior Publication Data
US 2014/0143604 A1  May 22, 2014

(51) Int. Cl.
*G06F 11/00* (2006.01)
*G06F 11/36* (2006.01)

(52) U.S. Cl.
CPC .................................. *G06F 11/362* (2013.01)
USPC ........................................... 714/38.1; 714/37

(58) Field of Classification Search
CPC ...................................................... G06F 11/36
USPC .................... 714/38.1, 37; 717/124, 125, 126
See application file for complete search history.

(56) References Cited

U.S. PATENT DOCUMENTS

| | | | | |
|---|---|---|---|---|
| 7,584,455 | B2 * | 9/2009 | Ball ................................ 717/124 |
| 7,587,636 | B2 * | 9/2009 | Tillmann et al. ................. 714/33 |
| 7,797,687 | B2 * | 9/2010 | Tillmann et al. .............. 717/131 |
| 8,302,080 | B2 * | 10/2012 | Wassermann et al. ........ 717/131 |
| 8,543,986 | B2 * | 9/2013 | Murthy et al. ................. 717/126 |
| 2004/0117772 | A1 * | 6/2004 | Brand et al. .................... 717/132 |
| 2007/0033440 | A1 * | 2/2007 | Tillmann et al. ................ 714/38 |
| 2012/0017117 | A1 | 1/2012 | Ghosh et al. |

OTHER PUBLICATIONS

Bjørner et al., "Path Feasibility Analysis for String Manipulating Programs", TACAS 2009 Proceedings of the 15th International Conference on Tools and Algorithms for the Construction and Analysis of Systems, pp. 307-321.
Ganesh et al., "HAMPI: A String Solver for Testing, Analysis and Vulnerability Detection (Invited Tutorial)", CAV 2011 Proceedings of the 23rd international conference on Computer aided verification, pp. 1-19.
Yu et al., "Stranger: An Automata-Based String Analysis Tool for PHP", TACAS 2010 Proceedings of the 16th international conference on Tools and Algorithms for the Construction and Analysis of Systems, pp. 154-157.
Hooimeijer et al., "An Evaluation of Automata Algorithms for String Analysis", VMCA 2011 Proceedings of the 12th international conference on Verification, model checking, and abstract interpretation, pp. 248-262.
U.S. Appl. No. 13/482,598, filed May 29, 2012.

\* cited by examiner

*Primary Examiner* — Dieu-Minh Le
(74) *Attorney, Agent, or Firm* — Maschoff Brennan

(57) ABSTRACT

A method of determining whether a set of constraints is satisfiable may include identifying a set of constraints associated with a software module. The method may also include modeling a string associated with a string constraint of the set of constraints as a parameterized array. Further, the method may include determining the satisfiability of the set of constraints based on a representation of the string constraint as a quantified expression. The satisfiability of the set of constraints may also be based on elimination of a quantifier associated with the quantified expression such that the string constraint is represented as a numeric constraint. The representation of the string constraint as a quantified expression may be based on the parameterized array that is associated with the string.

20 Claims, 3 Drawing Sheets

MIXED NUMERIC AND STRING CONSTRAINT ANALYSIS

FIELD

The present disclosure relates to analyzing and solving sets of electronic data constraints that include both numeric and string constraints.

BACKGROUND

A software application of electronic data may include any number of modules (e.g., classes, functions, procedures, subroutines, or code blocks), and each module may be tested or validated individually. In some instances, a software-testing tool, implemented as computer software or hardware, may automatically generate test cases for a software module under test, execute the module under test while simulating the test cases, and/or check for module behavior or output that does not agree with the test cases.

The software-testing tool may generate test cases based on determining the satisfiability of constraints associated with the software being tested. The constraints may include sets of both numeric and string constraints (referred to as "mixed numeric and string constraints" or "mixed constraints"). Traditional methods and procedures of determining the satisfiability of mixed numeric and string constraints may be considerably inefficient.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of determining whether a set of constraints is satisfiable may include identifying a set of constraints associated with a software module. The method may also include modeling a string associated with a string constraint of the set of constraints as a parameterized array. Further, the method may include determining the satisfiability of the set of constraints based on a representation of the string constraint as a quantified expression. The satisfiability of the set of constraints may also be based on elimination of a quantifier associated with the quantified expression such that the string constraint is represented as a numeric constraint. The representation of the string constraint as a quantified expression may be based on the parameterized array that is associated with the string.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings in which.

DESCRIPTION OF EMBODIMENTS

In some embodiments of the present disclosure, the satisfiability or unsatisfiability of mixed numeric and string constraints (referred to also as "mixed constraints") may be determined. In some embodiments, strings associated with the string constraints may be modeled as parameterized string arrays. Based on the parameterized string arrays, the string constraints may be represented as quantified expressions such that the satisfiability of the mixed constraints may be solved through quantifier elimination of the quantified expressions. The quantifier elimination may convert the quantified expressions (and therefore their associated string constraints) into a numeric form, which may then be solved with a numeric solver. Representing the strings as parameterized string arrays and the constraints as quantified expressions that may be solved by a numeric solver may reduce a number of iterations that may be used to determine whether the mixed constraints are satisfiable or unsatisfiable as compared to current satisfiability checking mechanisms and procedures of mixed numeric and string constraints.

In some instances, a quantifier of a quantified expression may be instantiated with one or more symbolic variables associated with one or more indices of the parameterized string arrays included in the quantified expression. In such embodiments, the satisfiability of a set of mixed constraints of which the quantified expression may be associated may be determined based on the instantiation of the quantified expression with the symbolic variables. In other instances, the quantified expression may be recursively unrolled to generate an incremented expression of the string constraint and the satisfiability or unsatisfiability of the associated set of mixed constraints may be determined based on an analysis of whether or not the incremented expression is satisfiable.

Embodiments of the present disclosure will be explained with reference to the accompanying drawings.

Figure 1:
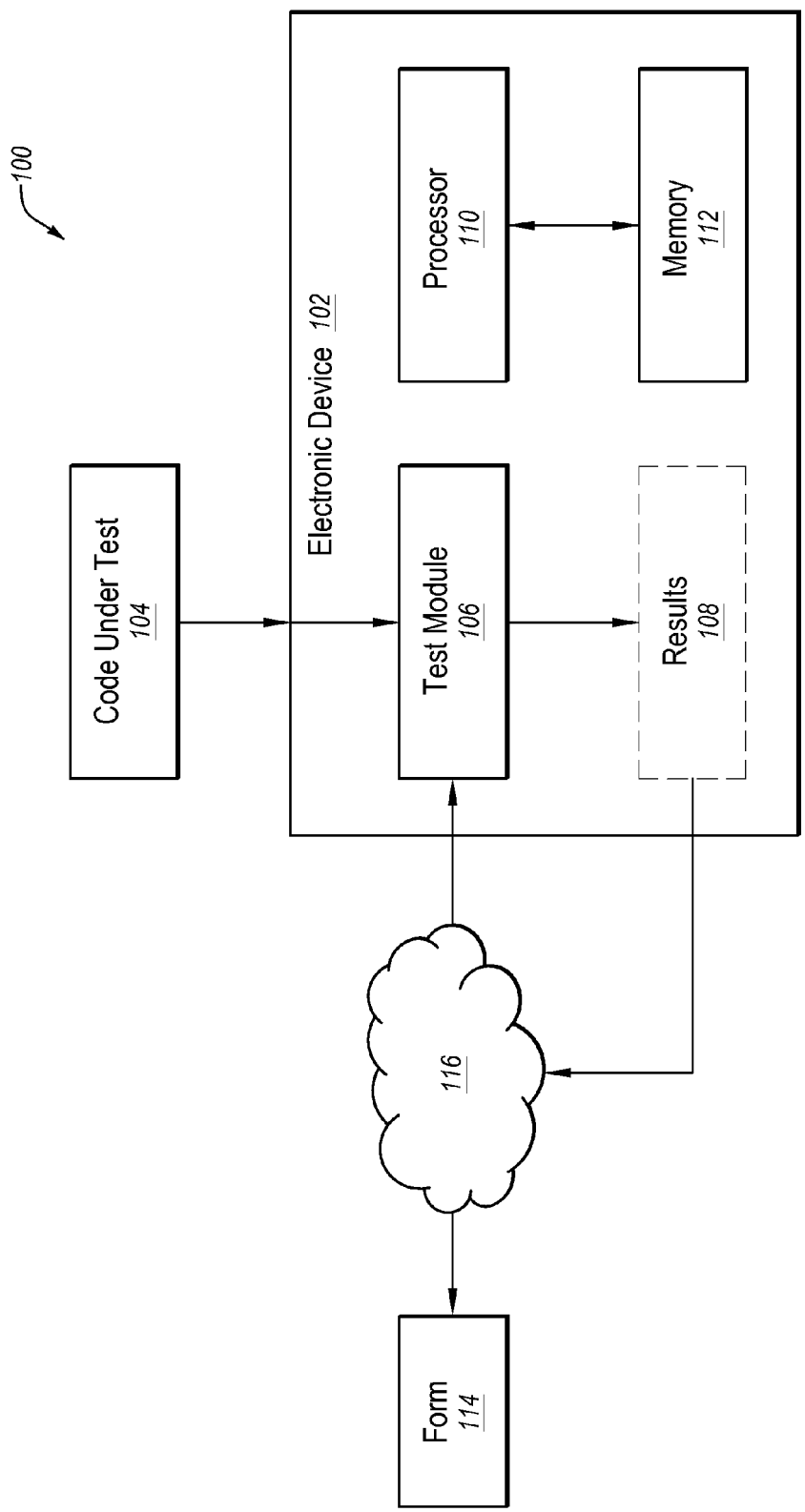
FIG. 1 is an example embodiment of a system for determining whether constraints, representing the operation of electronic data, are satisfiable or unsatisfiable.

FIG. 1 is an example embodiment of a system 100 for determining whether constraints, representing the operation of electronic data, are satisfiable or unsatisfiable, according to one or more embodiments of the present disclosure. The constraints may include mixed constraints and may be based on code, software, or other electronic data to be verified or tested. In the illustrated embodiment, the electronic data may be included in a code under test 104 or a form 114, described in further detail below. The system 100 may also include an electronic device 102 and a network 116.

The electronic device 102 may include any suitable system, apparatus, or device configured to determine the satisfiability or unsatisfiability of the code under test 104 or the form 114. In the illustrated embodiment, the electronic device 102 may include a test module 106 configured to perform one or more operations involved in determining the satisfiability and/or unsatisfiability of the code under test 104 or the form 114.

The test module 106 may be implemented by any suitable mechanism, such as a program, software, function, library, software-as-a-service, analog or digital circuitry, or any combination thereof. The electronic device 102 may also include a processor 110 coupled to a memory 112. The test module 106 may be embodied in logic or instructions resident in the memory 112 for execution by the processor 110. The processor 110 may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor 110 may interpret and/or execute program instructions and/or process data stored in the memory 112.

The memory 112 may include any suitable computer-readable media configured to retain program instructions and/or data for a period of time. By way of example, and not limitation, such computer-readable media may include tangible computer-readable storage media including RAM, ROM, EEPROM, CD-ROM or other optical disk storage, magnetic disk storage or other magnetic storage devices, flash memory devices (e.g., solid state memory devices) or any other storage medium which may be used to carry or store desired program code in the form of computer-executable instructions or data structures and which may be accessed by a general purpose or special purpose computer. Combinations of the above may also be included within the scope of computer-readable media. Computer-executable instructions may include, for example, instructions and data that cause a general purpose computer, special purpose computer, or special purpose processing device to perform a certain function or group of functions.

The code under test 104 or the form 114 may include electronic data, such as, for example, software, software code, libraries, applications, scripts, or other logic or instructions for execution upon an electronic device, such as the electronic device 102. In one embodiment, the code under test 104 may include a complete instance of such software. In another embodiment, the code under test 104 may include a portion of such software. The form 114 may include fields configured to receive information to be completed by a user, such as a human or computer user. In these or other embodiments, the form 114 may be implemented in, for example, a portion of a webpage, an active document, or web content.

The code under test 104 or the form 114 may be portions of a software application organized into a number of software modules, and each such software module may include code that performs specific functionalities. Such code may include the code under test 104 or the form 114. A software module may have any number of input or output variables. When the software module is invoked, actual input values may be passed to the software module (e.g., by the code that invokes the software module) as the values assigned to the input variables of the software module.

The code of the software module may be executed in connection with the actual input values. Eventually, actual output values for the output variables of the software module may be determined and returned by the software module, at which point the software module completes its execution. Moreover, the actual output values determined by the code of the software module may depend on the actual input values passed to the software module upon its invocation. In addition, the software module may have any number of local variables, also referred to as intermediate variables, whose values may also depend, directly or indirectly, on the values of the input variables. A local variable may have a local scope in which the local variable only exists and is only accessible from within the context of the software module in which the local variable is declared. In contrast, the software application, to which the software module belongs, may have any number of global variables. A global variable may have a global scope within the software application itself and is accessible to all the software modules that belong to the software application.

When a software module is invoked, it may access or modify the value of a global variable, and the value modification may be persistent even after the software module completes its execution.

In the code under test 104 or the form 114, when the value of a first variable is determined based on the value of a second variable (i.e., the value of the first variable depends on the value of the second variable), the first variable may be considered to depend on the second variable. A variable, whether input or output and whether local or global, usually has a specific data type, such as, for example and without limitation, character, string, integer, float, double, Boolean, pointer, array, and enumeration. The data type of a variable indicates what type of data (e.g., actual values) may be assigned to the variable. For example, integer values may be assigned to a variable whose type is integer; and true-false values may be assigned to a variable whose type is Boolean.

Different programming languages may define different data types that the variables of the software modules or applications written in the specific languages may have, as well as different operations that may be applied to the specific data types. In some embodiments, the data types of a programming language may include at least two categories: string and numeric. The code under test 104 and the form 114 may include both string and numeric data types.

A string is a data type that is available in many programming languages, although different programming languages may define strings differently. For example, the Java programming language defines the type "string" as a Java class "java.lang.String," which represents a string as an immutable array of characters. In this case, once a string variable is declared and created, its value may not be changed subsequently. Any modification to the value of a string variable results in a new string variable being declared and constructed. Class "java.lang.String" also provides many operations, referred to as "methods" that may be applied to a string variable. On the other hand, with the C programming language, a string may be defined as a one-dimensional character array that terminates with a null character. A string in the C programming language is mutable such that its value may be modified in-place. In fact, each character in the array may be modified individually.

A programming language may generally define several numeric data types, although the specific numeric data types available may vary from language to language. "Integer," "float," "double," and "Boolean" are examples of numeric data types that are commonly defined by most programming languages. Again, different programming languages may define specific numeric data types differently. For example, the Java programming language provides two ways to declare an integer variable: either as a primitive data type "int", or as a Java class "java.lang.Integer". Class "java.lang.Integer" provides operations (i.e., methods) that may be applied to an integer variable. On the other hand, the C programming language provides three primitive data types, "short", "int", and "long", that may be used to declare integer variables having different data sizes.

The code under test 104 and the form 114 may include various constraints, including both numeric constraints and string constraints. Furthermore, analysis of the code under test 104 and the form 114 may yield additional such constraints. Some applications, such as web applications, may include large numbers of string variables or character arrays leading to string constraints.

A constraint may include a restriction on the value of an input, an output, a local or an intermediate variable of a software module of the code under test 104 or the form 114.

The constraints placed on a variable may specify, for example, what values may be assigned to that variable, the size of the data values that may be assigned to the variable, or any other applicable conditions or limitations placed on the variable. In some embodiments, such constraints may be specified by or derived from: symbolic execution of the code under test 104 or the form 114; design specifications or formal requirements of the code under test 104 or the form 114; the specification of the programming language used to implement the code under test 104 or the form 114; the code included in or the programming logic of the code under test 104 or the form 114; a document object model of the code under test 104 or the form 114; the runtime environment within which the code under test 104 or the form 114 is to be executed; or other applicable factors.

The nature of a constraint may depend upon the data type of the associated variable. For example, a constraint for an integer "a" may be "a>5," a constraint for a Boolean "b" may be "b=TRUE," or a constraint for a string "c" may be "c='rst'." A set of constraints may have mixed data types with regards to individual constraints such that the set may be of mixed numeric and string constraints.

Sometimes, a constraint placed on one variable of the code under test 104 or the form 114 may depend, directly or indirectly, on the constraint placed on the value of another variable of the code under test 104 or the form 114. For example, two constraints may be jointly placed on an integer variable "b" specifying that: (1) integer variable "b" may only be assigned integer values that are greater than or equal to −10; and (2) integer variable "b" may only be assigned integer values that are less than the value of variable "a." In this case, the two constraints placed on integer variable "b" in combination with each other may be represented as "(b≥−10) && (b<a)." Accordingly, the constraints associated with the variable "b" may depend on each other because they may both affect the variable "b."

As another example, in some embodiments, constraints associated with the same string may be dependent on each other, and in other embodiments, constraints associated with the same string may be independent of each other. For example, a constraint associated with the indices zero to five of a string "s" may be dependent on another constraint associated with the indices two through seven of the string "s" because the indices associated with the constraints overlap with each other. However, a constraint associated with the indices zero to five of the string "s" may be independent of a constraint associated with the indices six to ten of the string "s" because even though both constraints may be associated with the string "s," the indices included in the two constraints do not overlap.

The code under test 104 or the form 114 may include any number of numeric or string variables, and these variables may be either input variables or local (i.e., intermediate) variables of the software module. In some embodiments, a set of constraints may be placed on a specific numeric or string variable of the code under test 104 or the form 114. In some embodiments, each variable may have at least one constraint placed on it. However, in other embodiments, a constraint may not be placed on every variable of a software module. A given variable may be associated with any number of numeric constraints or string constraints.

For example, the integer variable "b" may have a numeric constraint specifying that its value is be greater than or equal to −10 (e.g., "b≥−10"). The integer variable "b" may also have a string constraint specifying that the text (i.e., string) representation of its value is equal to the string "182" (e.g., "b.toString( )='182'"). In this case, the set of constraints placed on the integer variable "b" may include both numeric and string constraints, and therefore is a mixed set of constraints (e.g., "(b≥−10) && (b.toString( )='182')"). Similarly, in some embodiments, a given string variable may be associated with any number of string constraints or numeric constraints. For example, the string variable "s" may have a string constraint specifying that its value begins with a substring "ca" (e.g., "s.substring(0, 1)='ca'" or "s.startsWith ('ca')"). Additionally, the string variable "s" may also have a numeric constraint specifying that its value has a length of eight characters long (e.g., "s.length( )=8"). In this case, again, the set of constraints placed on the string variable "s" may include both numeric and string constraints, and therefore may be associated with a mixed set of constraints (e.g., "(s.substring(0, 1)='ca') && (s.length( )=8)").

In some embodiments, the constraints placed on the code under test 104 or the form 114 may include all the constraints, in combination, placed on its variables, including input, output, and local variables, and including numeric and string variables. Using the above examples of the integer variable "b" and the string variable "s," both may belong to the code under test 104 or the form 114. Additionally, the set of constraints placed on the portion of the code under test 104 or the form 114 being tested may include the logical conjunction of the two sets of constraints placed on the variables "b" and "s" respectively, which may equal "(b≥−10) && (b.toString( )="182") && (s.substring(0, 1)="ca") && (s.length( )=8)." This may also be considered a mixed set of constraints because the set includes both numeric and string constraints.

In some embodiments, the test module 106 may include a constraint solver configured to identify sets of constraints that may include mixed numeric and string constraints and to determine whether the sets of constraints are satisfiable or unsatisfiable. The test module 106 may identify and evaluate constraints based upon, for example, the designed operation or structure specified in the code under test 104 or the form 114. In some embodiments, the test module 106 may be configured to produce results 108 from testing the code under test 104 or the form 114. The results 108 may indicate whether portions of the code under test 104 or the form 114 have been determined to be satisfiable or unsatisfiable. In these or other embodiments, the test module 106 may generate one or more solutions for one or more sets of constraints if the constraints are satisfiable. In some embodiments, solving a set of constraints may include attempting to find one or more solutions that satisfy all the constraints included in the set. In some of these embodiments, the test module 106 may include the solutions with the results 108. In some embodiments, the solutions may be used to test the code under test 104 and/or the form 114.

In some embodiments, the form 114 and/or the code under test 104 may be provided to the test module 106 over the network 116. In other embodiments, the form 114 and/or the code under test 104 may be generated locally on the electronic device 102 or provided to the test module 106 via any other suitable data transfer mechanism or procedure.

As mentioned above, the test module 106 may be configured to determine whether constraints associated with the code under test 104 or the form 114 are unsatisfiable and thus contain errors. In this or other embodiments, the test module 106 may be configured to determine whether constraints associated with the code under test 104 or the form 114 is satisfiable and thus are validated. In some embodiments, the test module 106 may be configured to symbolically execute the code under test 104 or the form 114 to evaluate the code under test 104 or the form 114.

During such symbolic execution, the test module 106 may be configured to determine possible execution paths of the code under test 104 or the form 114. The possible execution paths may contain or yield sets of constraints involving numeric values and variables as well as string values and variables. The test module 106 may be configured to attempt to solve the numeric constraints and string constraints. If such constraints may be solved in context with one another, the execution path may be determined to be satisfiable. If such constraints may not be solved in context with one another, the execution path may be determined to be unsatisfiable. In one embodiment, such constraints may not be solved after a certain depth or length of symbolic execution. In such an embodiment, it may be unknown whether the constraints are satisfiable or unsatisfiable. Based on such determinations, the portion of the code under test 104 or the form 114 corresponding to the execution path may be identified as satisfiable, containing errors, or unknown as to satisfiability.

In some embodiments, the test module 106 may be configured to model the strings associated with the string constraints as parameterized arrays. A more detailed description of modeling the strings as parameterized arrays is given with respect to FIG. 2. Additionally, the parameterized arrays may allow for representing the string constraints as quantified expressions such that the quantified expressions may be based on the parameterized arrays associated with the strings of the string constraints. A more detailed description of the representation of a string constraint as a quantified expression is also given with respect to FIG. 2. Representing the strings as parameterized arrays and the string constraints as quantified expressions may format the string constraints in a manner that the string constraints may be solved with a numeric solver while also reducing a number of iterations that may be used to determine whether the code under test 104 or the form 114 is satisfiable or unsatisfiable.

In some embodiments, the test module 106 may instantiate quantifiers of the quantified expressions with one or more symbolic variables associated with one or more indices of the parameterized string arrays. In such embodiments, the satisfiability of the constraints of which the parameterized arrays may be associated may be determined based on the instantiation of the quantified expressions with the symbolic variables. In some of these embodiments, the test module 106 may determine a solution of the constraints if the constraints are deemed to be satisfiable. The instantiation, and satisfiability and solution determinations are described in further detail below with respect to FIG. 2.

In these or other embodiments, the test module 106 may be configured to recursively unroll a quantified expression associated with a string constraint to generate an incremented expression of the string constraint. In such instances, the test module 106 may determine the satisfiability or unsatisfiability of constraints with which the quantified expression is associated based on an analysis of whether or not the incremented expression is satisfiable.

Figure 2:
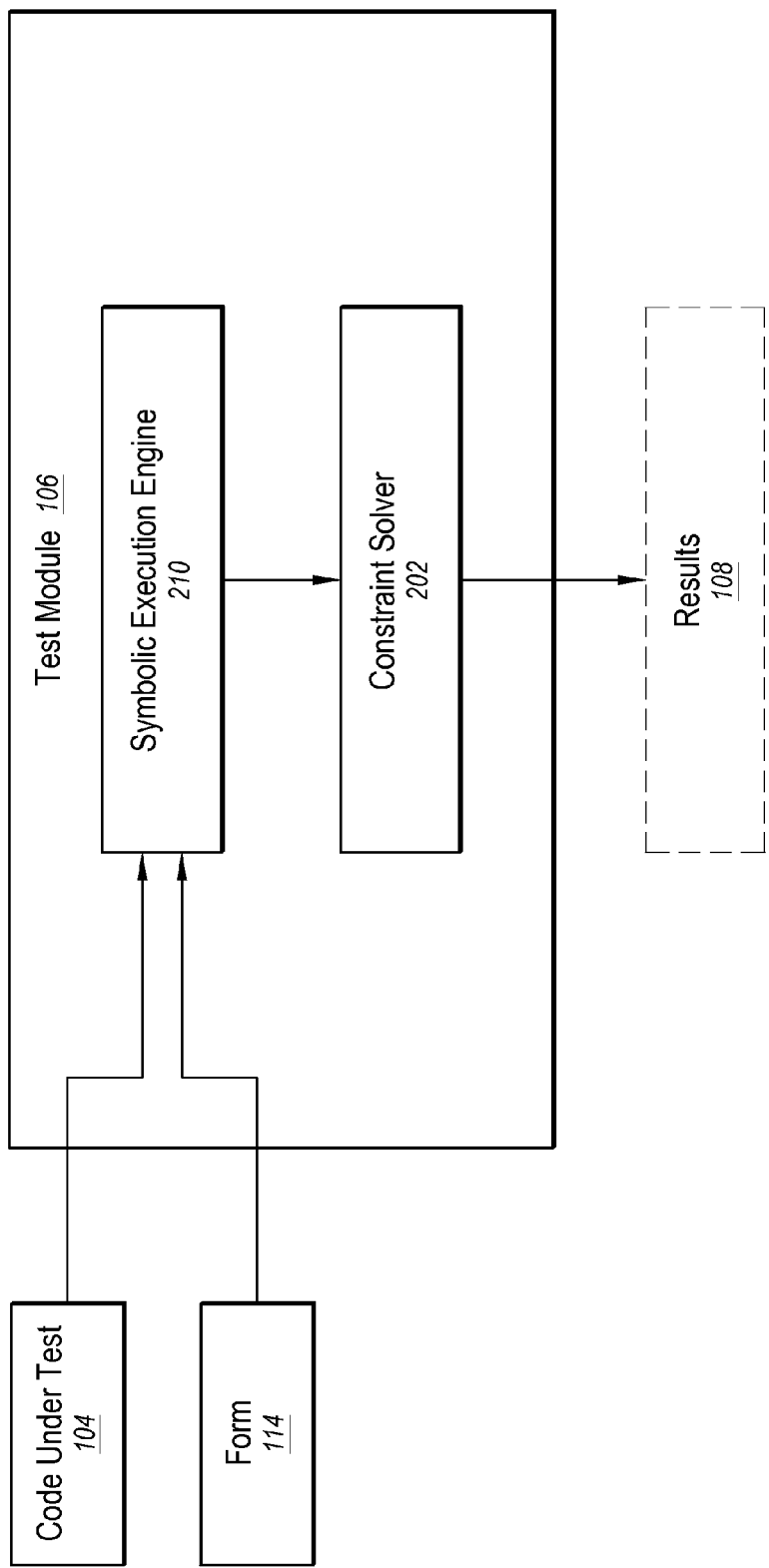
FIG. 2 illustrates an example embodiment of a test module that may be included in the system of FIG. 1.

FIG. 2 illustrates an example embodiment of the test module 106 that may be included in the system 100 of FIG. 1, according to some embodiments of the present disclosure. The test module 106 may include a symbolic execution engine 210, and a constraint solver 202 communicatively coupled to each other. Although the symbolic execution engine 210 and the constraint solver 202 are shown individually, each may be combined or otherwise implement the functionality of another in any suitable fashion.

The symbolic execution engine 210 may be configured to symbolically execute the code under test 104 or the form 114. The symbolic execution engine 210 may be configured to analyze sequences of instructions and to apply symbolic execution to the sequences of instructions in order to determine constraints associated with the sequences of instructions.

In some embodiments, the symbolic execution engine 210 may model strings associated with the code under test 104 or the form 114 as parameterized arrays. For example, a string "s1" may be modeled as a parameterized array where characters associated with the string "s1" may be represented by symbolic characters. The symbolic characters may represent any number of the possible characters that may be associated with a corresponding index of the parameterized array.

By way of example, a character of the string "s1" at the first index of the string "s1" may be represented by a symbolic character $C_0$, which may be expressed as $s1[0]=C_0$; the character of the string "s1" at the second index of the string "s1" may be represented by a symbolic character $C_1$, which may be expressed as $s1[1]=C_1$; the character of the string "s1" at the third index of the string "s1" may be represented by a symbolic character $C_2$, which may be expressed as $s1[2]=C_2$, etc. Note that according to some programming languages, such as the Java programming language, and in the example given above, indexing may begin with zero; that is, the index number of the first element of "s1" may be zero, the index number of the second element of "s1" may be one, etc. Additionally, in some embodiments the symbolic execution engine 210 may represent the length of the string with a symbolic variable. For example the length of the string "s1" may be represented by a symbolic variable "$len_{s1}$."

In some embodiments, the constraints determined by the symbolic execution engine 210 may include both numeric constraints and string constraints. The symbolic execution engine 210 may be configured to pass the determined constraints to the constraint solver 202, which may be configured to determine the satisfiability of the constraints. Once sets of constraints are solved, determined to be satisfiable, or determined to be unsatisfiable by the constraint solver 202, the symbolic execution engine 210 may be configured to analyze additional sequences of instructions, to apply symbolic execution to the sequences, to determine constraints associated with the sequences, and to send the associated constraints to the constraint solver 202. The symbolic execution engine 210 may be configured to repeat such actions until, for example, the code under test 104 or the form 114 has been completely tested or limits on symbolic execution such as depth or time have expired.

The constraint solver 202 may be configured to determine the satisfiability of the constraints received from the symbolic execution engine 210. The result of the analysis may include, for example, a determination in results 108 that the constraints are unsatisfiable, or solutions associated with solving for various criteria contained within the constraints if the constraints are satisfiable.

In some embodiments, the constraint solver 202 may be configured to determine the satisfiability of the constraints by first dividing the constraints into independent groups or parts. As explained above, one or more constraints may depend on each other based on the constraints sharing the same symbolic variables and/or string portions. Accordingly, in some embodiments, the constraint solver 202 may group the constraints based on whether or not the constraints depend on each other such that constraints that depend on each other may be included in the same set of constraints and those that do not depend on each other may be included in different sets of constraints. In these embodiments, the constraint solver may subsequently determine the satisfiability or unsatisfiability of each set of constraints individually.

By way of example, the code under test 104 or the form 114 may include the following constraints:

```
"index_num = str.find_last_of('/') && index_num != −1 &&
str.substr(index_num + 1).find('EasyChair') != −1 &&
str.compare(0, 7, 'http://') == 0 && t = str.substr(7, index_num−7)
&& t = 'live.com.'"
```

Based on the dependency of elements in the above listed constraints, the constraint solver 202 may group the above listed constraints into a shared group G0, which may be a group upon which the other groups may depend; a first group G1; a second group G2; and a third group G3. Each group may give a solution to a portion of the string, and a solution to the entire string may be obtained by combining the solutions of all the string portions. The groups may be expressed as follows:

G0="index_num=str.find_last_of('/') && index_num!=−1;"

G1="G0 && str.substr(index_num+1).find('EasyChair') !=−1;"

G2="G0 && str.compare(0, 7, 'http://')==0;" and

G3="G0 && t=str.substr(7, index_num−7) && t='live.com.'"

The constraint solver 202 may determine the satisfiability or unsatisfiability of the independent sets of constraints that include one or more string constraints based on an analysis of a quantified expression of the string constraints within a particular set of constraints. In some embodiments, the constraint solver 202 may generate the quantified expression of the string constraint, and in other embodiments, the constraint solver 202 may receive the quantified expression as an input.

When calculating the dependency to divide the constraints into groups, the constraint solver 202 may invoke a numeric solver like a Satisfiability Modulo Theories (SMT) solver. For example, substring str[0,i] and substring str[j,j+10] are dependent when there are no other constraints on symbolic variables "i" and "j." However they may be independent if other constraints (e.g., j=i+1) indicating that i<j exist. The constraint solver 202 may accordingly make this determination using an underlying numeric solver.

In the present disclosure, "quantification" or a "quantified expression" may refer to a construct that specifies the quantity of specimens in a particular domain of discourse that may apply to (or satisfy) an open formula. Two kinds of quantification that may be found in predicate logic and that may be used in the present disclosure are universal quantification ("for all" elements of a particular domain) and existential quantification ("there exists" within the elements of the particular domain). The traditional symbol for the universal quantifier "for all" is "$\forall$," an inverted letter "A," and for the existential quantifier "exists" is "$\exists$," a mirrored letter "E."

A quantified expression of a string constraint may represent various logical properties of the string constraint in a quantified form. For example, the constraint "index_num=str.find_last_of('/')" of the shared group G0 described above may set a value of a variable "index_num" as the index number of a string "str" where the last instance of the character "/" of the string "str" may be found. Therefore, any character at an index number of the string "str" from the value of "index_num+1" to the length minus one ("len−1") of the string "str" may not be a "/." Such a constraint may accordingly be expressed as a quantified expression of "$\forall i \in$ [index_num+1, len−1]: str[i]!='/,'" which may be read as "for all integers 'i' included in the set from 'index_num+1' to 'len−1,' the character of 'str' at any one of the index numbers 'i' may not equal '/.'"

As mentioned above, the strings received from the symbolic execution engine 210 may be represented as parameterized arrays such that the string "str" in the example above may include a parameterized array of symbolic characters. The symbolic characters may allow for representing the string "str" without knowing which characters actually are included in the string "str" or knowing the actual length of the string "str." Such a representation may also allow for determining the satisfiability of the string "str" without having concrete values of the string "str" or a concrete length of the string "str." Additionally, a quantified expression may be placed in a format that may be solved using a numeric solver such that the set of constraints including string constraints may be solved using a numeric solver.

As another example, the same constraint "index_num=str.find ('/')" may also be represented by the quantified expression of "$\exists i \in$ [0, index_num]: str[i]='/,'" which may be read as "there exists for integers 'i' included in the set from '0' to 'index_num,' a character of 'str' at any one of the index numbers 'i' that equals '/.'"

Table 1 below gives other examples of constraints and the corresponding quantified expressions that may be used to represent the constraints:

TABLE 1

| Constraint | Quantified Expression |
| --- | --- |
| s.find_last_of(c) = −1 | $\forall i \in$ [0, s.len) : s[i] != c |
| s.find(c) != −1 | $\exists i \in$ [0, s.len) : s[i] = c |
| s1.substr(i1) = s2 | s2.len = s1.len−i1 && $\forall i \in$ [0, s2.len) : s[i1+i] = s2[i] |
| s1.replace_at(k, c) = s2 | s2.len = s1.len && s2[k] = c && $\forall i \in$ [0, s1.len) : i !=k => s2[i] = s1[i] |
| s1.replace_all(c1, c2) = s2 | s2.len = s1.len && $\forall i \in$ [0, s1.len) :s2[i] = if s1[i] = c1 then c2 else s1[i] |
| s1.to_lower_case( ) = s2 | s2.len = s1.len && $\forall i \in$ [0, s1.len) : s2[i] = if s1[i] ≤ 'Z' then s1[i] + 32 else s1[i] |

In Table 1, the variables "s," "s1," and "s2" are strings, "c," "c1," and "c2" are characters, and "s.len," "s1.len," "s2.len," "k," and "i1" are integers. Each of these variables may be symbolic which may allow for solving the above constraints based on their associated quantified expressions.

In some instances, operations and constraints associated with a string may be simplified to generate un-quantified, numeric constraints. For example, the constraint "str.startsWith('abc')" may be converted to numeric constraints "str[0]='a' && str[1]='b' && str[2]='c'". As another example, if the length of the string "s2" is known to be two, then constraint "s1.endsWith(s2)" may be converted to the following numeric constraints: "s1[s1.len−2]=s2[0] && s1[s1.len−1]=s2[1]."

Additionally, in some instances, operations and constraints associated with a string may be based on another string such that the quantified expressions of the associated constraints may have multiple levels. For example, an operation of the string "s1" of "s1.find_first_of(s2)" may be based on the string "s2." Therefore, an associated constraint of "s1.find_first_of(s2)!=−1," which indicates that "s2" is found in "s1" may be represented with one or more quantified expressions having multiple levels. Accordingly, in the present example, the constraint "s1.find_first_of(s2)!=−1" may be represented by the following quantified expressions: "$\exists i \in$[0, s1.len−s2.len]: ($\forall j \in$[0, s2.len): s1[i+j]=s2[j]) &&

"($\forall k<i$: $\exists j\epsilon[0, s2.len]$: $s1[k+j]!=s2[j]$)," where "i" is the starting position of the string "s2" in the string "s1."

In the above quantified expressions "$\exists i\epsilon[0, s1.len-s2.len]$" indicates that the starting position index number "i" of the string "s2" in the string "s1" may be anywhere from "0" to the length of "s1" (represented by the symbolic variable "s1.len") minus the length of "s2" (represented by the symbolic variable "s2.len"). Additionally, in the above quantified expressions, "($\forall j\epsilon[0, s2.len]$: $s1[i+j]=s2[j]$)" indicates that "s2" appears in "s1" starting at the position "i." Further, in the above quantified expressions, "($\forall k<i$: $\exists j\epsilon[0, s2.len]$: $s1[k+j]!=s2[j]$)" indicates that "i" is the first valid starting position of "s2" in "s1." Accordingly, as illustrated above, multiple levels of quantified expressions may exist in representing constraints where the operation of a string may be based on another string, such as "s1.find(s2)!=-1."

In some embodiments, the constraint solver 202 may be configured to determine the satisfiability of the set of constraints that may include one or more quantified expressions through directly eliminating the quantifiers of the quantified expressions by instantiating the quantifiers. In other embodiments, the constraint solver 202 may be configured to determine the satisfiability of the set of constraints that may include the quantified expressions through eliminating the quantifiers by recursively unrolling the quantified expressions. As mentioned above, the quantifier elimination of the quantified expressions may put the quantified expressions (and therefore their associated string constraints) in numeric form such that they may be solved using a numeric solver. The constraint solver 202 may determine the satisfiability of a set of constraints through instantiating the quantifier if the quantified expressions associated with the set of constraints do not have multiple levels that may not allow for direct quantifier elimination through instantiation. Conversely, the constraint solver 202 may determine the satisfiability of a set of constraints using quantifier elimination through recursive unrolling if the quantified expressions associated with the set of constraints have multiple levels that may not allow for direct quantifier elimination through instantiation.

If a set of constraints may be solved by instantiating the quantifiers of its associated quantified expressions, the constraint solver 202 may instantiate the quantifiers of the quantified expressions with one or more specific symbolic variables. In some embodiments, a "for all" quantifier may be instantiated with possible symbolic variables that may appear in the indices of the string arrays associated with the set of constraints being analyzed. The possible symbolic variables may be referred to hereinafter as an "index set." In general, expressions that are not quantified variables and that appear in the indices of the array accesses are included in the index set. In these or other embodiments, an "exits" quantifier may be instantiated with a new symbolic variable such that the "exists" quantifier may be eliminated by introducing a fresh symbolic variable. Instantiation of a quantifier may include substituting each instance of the quantifier with the selected symbolic variable and formatting the quantified expression such that it may be solved with a numeric type solver.

For example, the shared group G0 may include the quantified expression "$str[index\_num]='/'$ && $\forall i\epsilon[index\_num+1, len-1]$: $str[i]!='/'$," as described above, such that the shared group G0 may be expressed as follows: "$str[index\_num]='/'$ && $\forall i\epsilon[index\_num+1, len-1]$: $str[i]!='/'$ && $index\_num!=-1$." Therefore, for the shared group G0 with the above quantified expression, the index set may include "index_num" because "index_num" appears in the index of the string "str," and the index of the string "str" is also dictated by the value "i" of the "$\forall i$" quantifier. Therefore, the "$\forall i$" quantifier may be instantiated with the symbolic variable "index_num" such that the set of constraints may be instantiated, formatted and expressed as "$index\_num<len-1$ && ($index\_num\epsilon[index\_num+1, len-1]$)$==>str[index\_num]!='/'$ && $index\_num!=-1$." This expression is satisfiable if the original quantified expression is satisfiable. That is, the quantifier elimination is sound in terms of satisfiability. As mentioned above, expressions that are not quantified variables and that appear in the indices of the array accesses are included in the index set. For this example, the index set includes only "index_num" to make the quantifier elimination sound. In some embodiments, after the constraint solver 202 assigns concrete values to the symbolic variables (e.g., "index_num=0", "len=1", and "str[0]='/'"), a solution to the string "str" may be obtained (e.g., "str='/'").

As another example, for a different set of constraints including quantified expressions as follows: "$\forall i\epsilon[0, k-1]$: $s1[i]=0$ && $s2[k]=0$ && $\forall i$: $i!=k==>s2[i]=s1[i]$ && $\exists i$. $i\leq k$ && $s2[i]!=0$," the "$\exists i$" quantifier may be instantiated with a new variable "j" such that the constraints may now be expressed as a modified set of constraints as follows: "$\forall i\epsilon[0, k-1]$: $s1[i]=0$ && $s2[k]=0$ && $\forall i$: $i!=k==>s2[i]=s1[i]$ && $j\leq k$ && $s2[j]!=0$." After eliminating the "$\exists i$" quantifier, an index set may be determined for the modified set of constraints. The index set for the modified set of constraints may include the variables "k" and "j" because both "k" and "j" appear in the index of the string "s2," and the index of the string "s2" is also dictated by the value "i" of the "$\forall i$" quantifier. Therefore, the "$\forall i$" quantifier of the modified quantified expression may be instantiated one time with "k" and another time with "j" such that the set of constraints may be formatted and expressed as: "$0\leq j\leq k-1==>s1[j]=0$ && $s2[k]=0$ && $j!=k==>s2[j]=s1[j]$ && $0\leq k\leq k-1==>s1[k]=0$ && $s2[k]=0$ && $k!=k==>s2[k]=s1[k]$ && $j\leq k$ && $s2[j]!=0$."

Once the instantiation is done, the constraint solver 202 may determine the satisfiability of the constraints based at least partially on the instantiation of the quantified expression. In some embodiments, the constraint solver 202 may simplify the instantiated set of constraints by determining if there are any logically trivial statements whose implications may be inconsistent and may remove such statements. For example, "$k!=k==>s2[k]=s1[k]$" may be removed since its implication "$k!=k$" is false. The constraint solver 202 may attempt to solve the remaining constraints to determine whether the associated set of constraints is satisfiable. In some embodiments, the remaining constraints are unsatisfiable, indicating that the original quantified constrains are also unsatisfiable. In some embodiments, the constraint solver 202 may solve the satisfiable statements and thus, may determine a concrete solution for the set of constraints.

For example, the constraint solver 202 may determine the satisfiability of the instantiated constraints "$index\_num<len-1$ && ($index\_num\epsilon[index\_num+1, len-1]$)$==>str[index\_num]!='/'$ && $index\_num!=-1$" after any logically trivial statement are removed. In the illustrated example, the statement "$index\_num\epsilon[index\_num+1, len-1]==>str[index\_num]!='/'$" is logically trivial because the statement requires that the set of which "index_num" is to be included starts at "index_num+1." Further, "$str[index\_num]!='/'$" does not matter since the implication of this statement is false. Therefore, for this example, the instantiated quantified expression may be simplified to "$index\_num<len-1$ && $index\_num!=-1$," which may be determined by the constraint solver 202 to be satisfiable. Therefore, in some embodiments, the constraint solver 202 may determine a solution for the simplified expression using any suitable method or process, which may in some instances include a numeric type solver. Additionally, using direct quantifier elimination through instantiation, the constraint solver 202 may determine the satisfiability of the associated set of constraints by performing little to no iterations, which may increase the efficiency of the constraint solver 202.

As another example, the constraint solver 202 may determine the satisfiability of the instantiated quantified expression "$0 \leq j \leq k-1 \Longrightarrow s1[j]=0$ && $s2[k]=0$ && $j!=k \Longrightarrow s2[j]=s1[j]$ && $0 \leq k \leq k-1 \Longrightarrow s1[k]=0$ && $s2[k]=0$ && $k!=k \Longrightarrow s2[k]=s1[k]$ && $j \leq k$ && $s2[j]!=0$" by first searching for and removing any logically trivial statements. In the above expression, the statements "$0 \leq k \leq k-1 \Longrightarrow s1[k]=0$" and "$k!=k \Longrightarrow s2[k]=s1[k]$" are logically trivial, such that the instantiated quantified expression may be simplified as: "$0 \leq j \leq k-1 \Longrightarrow s1[j]=0$ && $s2[k]=0$ && $j!=k \Longrightarrow s2[j]=s1[j]$ && $s2[k]=0$ && $j \leq k$ && $s2[j]!=0$," which may be determined by the constraint solver 202 to be unsatisfiable.

As mentioned above, in some instances, the quantified expressions associated with a set of constraints may include multiple levels of specific forms such that the satisfiability of the associated set of constraints may not be determined using direct quantifier elimination through instantiation. In such instances, the constraint solver 202 may be configured to perform quantifier elimination through recursively unrolling the quantified expression to generate an incremented expression of the associated string constraint.

By way of example, the following quantified expression "$\forall i \in [0, k-1]: \exists j \in [i, k]: s1[i]=k+s2[i+j]$" may be recursively unrolled to generate the following expression "$\exists j \in [0, k]: s1[0]=k+s2[j]$ && $\forall i \in [1, k-1]: s1[i]=k+s2[i+j]$." As depicted above, the first value of "i" defined in the quantified expression, which in the illustrated example is "0," may be used to replace "i" in the portion "$\exists j \in [i, k]: s1[i]=k+s2[i+j]$" of the quantified expression to generate an incremented expression of "$\exists j \in [0, k]: s1[0]=k+s2[j]$.", which may be solved using the technique described above (e.g., by replacing "j" with a new variable to eliminate the quantified expression). Accordingly, the remaining portion of the quantified expression may be expressed as the domain of "i" excluding the value "0," which may be expressed as "$\forall i \in [1, k-1]: \exists j \in [i, k]: s1[i]=k+s2[i+j]$." Note that the combination of the remaining quantified expression and the incremented expression covers the same domain as the original quantified expression.

The constraint solver 202 may determine the satisfiability of the set of constraints based on solving the set of constraints with respect to the incremented expression and ignoring the remaining quantified expression. In some embodiments, the constraint solver 202 may continue unrolling the quantified expression until reaching an unsatisfiable result, until reaching the end of the domain being unrolled, or after unrolling the quantified expression a certain number of times (referred to hereinafter as reaching an unrolling limit). In some of these embodiments, if the constraint solver 202 encounters an unsatisfiable incremented expression or reaches the unrolling limit, the constraint solver 202 may determine that the set of constraints is unsatisfiable. However, if the constraint solver 202 reaches the end of the recursive unrolling of the quantified expression and each incremented expression yields a satisfiable result, the constraint solver 202 may determine that the set of constraints is satisfiable. Similar to determining the satisfiability of the set of constraints based on quantifier instantiation, the constraint solver 202 may also use a numeric solver to determine the satisfiability using the recursive unrolling.

By way of example, the above quantified expression of "$\forall i \in [0, k-1]: \exists j \in [i, k]: s1[i]=k+s2[i+j]$" may be included in the following set of constraints: "$\forall i \in [0, k-1]: \exists j \in [i, k]: s1[i]=s2[i+j]$ && $s1[0]!=s2[m]$ && $m=0$ && $\forall j \in [1, k+2]: s1[0]!=s2[j]$." The constraint solver 202 may accordingly unroll the quantified expression to generate the incremented expression "$\exists j \in [0, k]: s1[0]=k+s2[j]$." The constraint solver 202 may ignore the remaining quantified expression and may include the incremented expression with the remaining constraints to generate the following set of constraints: "$\exists j \in [0, k]: s1[0]=s2[j]$ && $s1[0]!=s2[m]$ && $m=0$ && $\forall j \in [1, k+2]: s1[0]!=s2[j]$." This set of constraints is not satisfiable, and the constraint solver 202 may accordingly determine as such. The constraint solver 202 may accordingly stop unrolling the quantified expression and may indicate that the set of constraints is unsatisfiable. In some embodiments, the constraint solver 202 may include this indication in the results 108.

As another example, the above quantified expression of "$\forall i \in [0, k-1]: \exists j \in [i, k]: s1[i]=k+s2[i+j]$" may be included in the following set of constraints: "$\forall i \in [0, k-1]: \exists j \in [i, k]: s1[i]=s2[i+j]$ && $s1[0]=s2[m]$ && $m=j$." As described above, the constraint solver 202 may unroll the quantified expression to generate the incremented expression "$\exists j \in [0, k]: s1[0]=k+s2[j]$" and may ignore the remaining quantified expression. Therefore, the constraint solver 202 may include the incremented expression with the remaining constraints to generate the following set of constraints: "$\exists j \in [0, k]: s1[0]=s2[j]$ && $s1[0]=s2[m]$ && $m=j$." This set of constraints is satisfiable, and the constraint solver 202 may accordingly determine as such. The constraint solver 202 may then continue unrolling the quantified expression to determine whether the set of constraints is solvable. In some embodiments, the constraint solver 202 may include this indication in the results 108.

In some instances, as the constraint solver 202 is unrolling the quantified expression, the quantified expression may be put in a form that may allow for determining the satisfiability of the set of constraints through instantiation of the quantified expression, as described above. For example, the multi-level quantified expressions may be eliminated through the recursive unrolling such that only single-level quantified expressions may remain. Accordingly, in some embodiments, the constraint solver 202 may be configured to determine whether the satisfiability of a remaining quantified expression, after extracting an incremented expression through unrolling, may be determined by instantiating the quantifiers of the remaining quantified expression, as described above. The constraint solver 202 may make this determination based on whether or not the remaining quantified expression is a single-level or multi-level quantified expression.

In some instances, the constraint solver 202 may derive extra numeral constraints from the quantified representation of the string constraints. For example, from the quantified expression "$\forall i \in [0, k]: s1[i]=s1[i+1]$", the constraint solver 202 may derive an equivalent un-quantified constraint "$i \leq k+1 \Longrightarrow s1[i]=s1[0]$." With these derived constraints, the constraint solver 202 may be able to find a solution more quickly.

Therefore, through representing a string constraint as a quantified expression, the satisfiability of a set of constraints that may include both numeric and string constraints may be determined by using a numeric type solving method. Such a configuration may also reduce the number of iterations that may be done in determining the satisfiability of mixed sets of constraints as compared to traditional satisfiability determination schemes because solving through instantiation of the quantified expressions may not include iterative solving and recursive unrolling may reduce the number of iterations used as compared to traditional solving methods.

Figure 3:
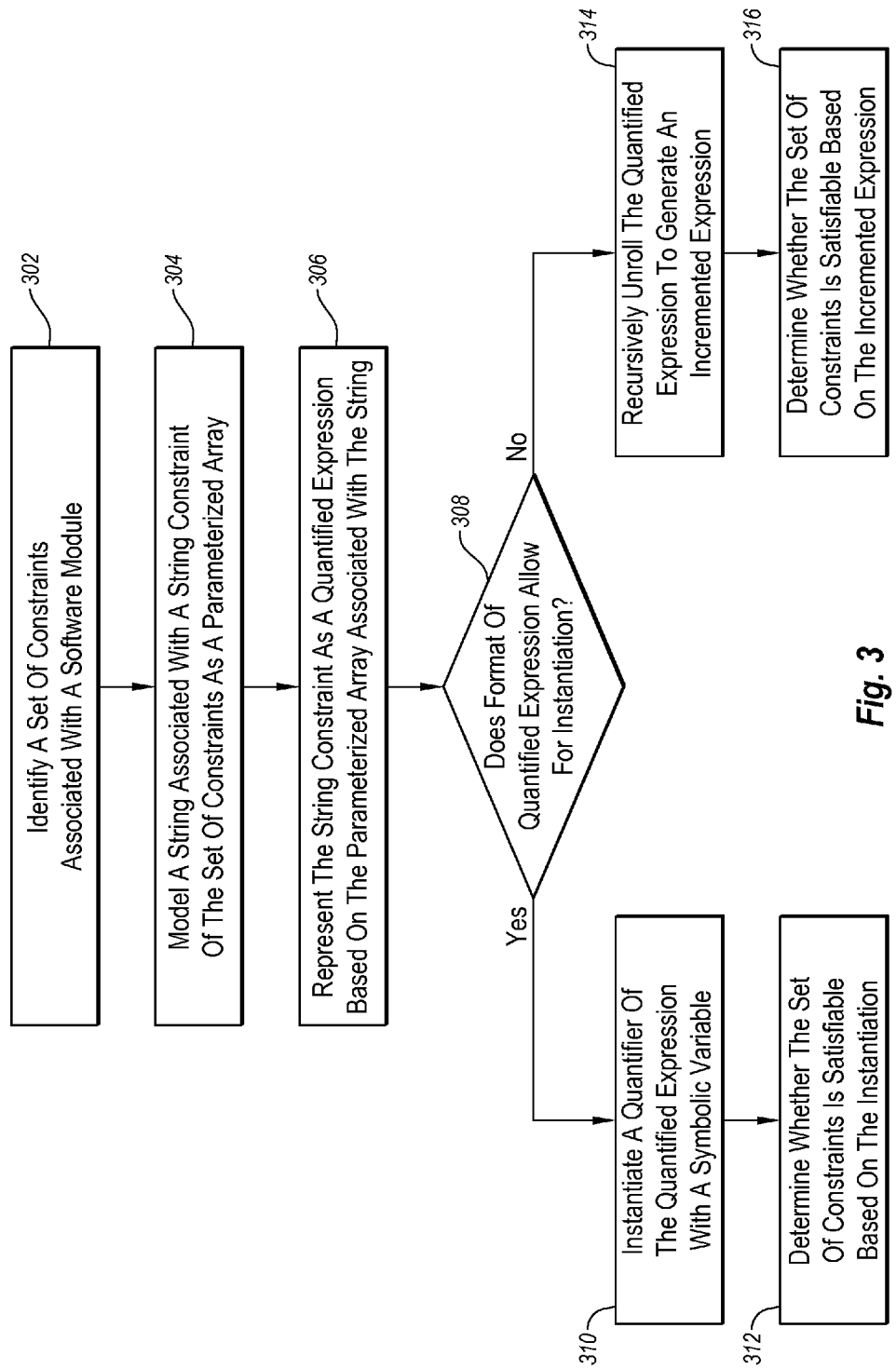
FIG. 3 is a flow chart of an example method of determining the satisfiability of a set of constraints, all arranged in accordance with at least some embodiments described herein.

FIG. 3 is a flow chart of an example method 300 of determining the satisfiability of a set of constraints, in accordance with some embodiments of the present disclosure. The method 300 may be implemented, in some embodiments, by an electronic device, such as the electronic device 102 of FIG. 1. For instance, the test module 106 described in FIGS. 1 and 2 of the electronic device 102 may be configured to execute computer-readable instructions to perform operations for determining the satisfiability of a set of constraints as represented by one or more of the blocks of the method 300. Although illustrated as discrete blocks, various blocks may be divided into additional blocks, combined into fewer blocks, or eliminated, depending on the desired implementation.

The method 300 may begin at block 302, where a set of constraints associated with a software module may be identified. At a block 304, a string associated with a string constraint of the set of constraints may be modeled as a parameterized array. At a block 306, the string constraint may be represented as a quantified expression based on the parameterized array associated with the string.

At a block 308, it may be determined whether the format of the quantified expression allows for instantiation of the quantified expression. For example, it may be determined whether the quantified expression includes multiple levels or not, and whether the multiple levels allow for direct quantifier elimination through instantiation. If the format does allow for instantiation (e.g., the quantified expression does not include multiple levels), the method 300 may proceed to a block 310. If the format does not allow for instantiation (e.g., the quantified expression does include multiple levels that do not allow for direct quantifier elimination through instantiation), the method 300 may proceed to a block 314.

At block 310, a quantifier of the quantified expression may be instantiated with a symbolic variable and, at a block 312, it may be determined whether the set of constraints is satisfiable based on the instantiation. At block 314, the quantified expression may be unrolled to generate an incremented expression. And, at a block 316, it may be determined whether the set of constraints is satisfiable based on the incremented expression.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include steps associated with grouping constraints into the set of constraints based on the constraints depending on each other. Additionally, an index set may be determined and the symbolic variable used in instantiation may be based on one or more variables included in the index set. Further, in some embodiments, if the set of constraints is satisfiable, a solution may be determined for the satisfiable set of constraints. In some of these embodiments, the solution may be used to test a software module associated with the constraints. Also, in some embodiments, after recursively unrolling a quantified expression at the block 314, it may be determined whether the set of constraints may be solved using quantifier instantiation instead of continuing with the recursive unrolling. In such instances where quantifier instantiation may be used, the method 300 may transition from blocks 314 and 316 to blocks 310 and 312.

As mentioned above, the embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. As described above, such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, flash memory device, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are described as being implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of determining whether a set of constraints is satisfiable, the method comprising:
    identifying a set of constraints associated with a software module;
    modeling a string associated with a string constraint of the set of constraints as a parameterized array; and
    determining a satisfiability of the set of constraints based on a representation of the string constraint as a quantified expression and based on elimination of a quantifier associated with the quantified expression such that the string constraint is represented as a numeric constraint, the representation of the string constraint as a quantified expression being based on the parameterized array associated with the string.

2. The method of claim 1, further comprising:
    eliminating the quantifier through instantiating the quantifier with a symbolic variable; and determining whether the set of constraints is satisfiable based on the instantiation of the quantifier with the symbolic variable.

3. The method of claim 2, wherein the quantifier is an "exists" quantifier.

4. The method of claim 2, wherein the quantifier is a "for all" quantifier.

5. The method of claim 2, further comprising:
determining an index set for the quantifier based on one or more expressions associated with one or more indices of the quantified expression; and
determining the symbolic variable based on the index set.

6. The method of claim 2, further comprising generating a solution of the set of constraints if the set of constraints is satisfiable.

7. The method of claim 6, further comprising testing the software module based on the solution of the set of constraints.

8. The method of claim 1, further comprising:
determining a dependency of the string constraint with respect to the set of constraints; and
grouping the string constraint with the set of constraints based on the determined dependency.

9. The method of claim 1, further comprising:
eliminating the quantifier through recursively unrolling the quantified expression to generate an incremented expression of the string constraint; and
determining whether the set of constraints is satisfiable based on the incremented expression.

10. The method of claim 9, further comprising:
generating a solution of the set of constraints if the set of constraints is satisfiable; and
testing the software module based on the solution of the set of constraints.

11. A computer-readable storage medium including computer executable instructions configured to cause a system to perform operations for determining whether a set of constraints is satisfiable, the operations comprising:
identifying a set of constraints associated with a software module;
modeling a string associated with a string constraint of the set of constraints as a parameterized array; and
determining a satisfiability of the set of constraints based on a representation of the string constraint as a quantified expression and based on elimination of a quantifier associated with the quantified expression such that the string constraint is represented as a numeric constraint, the representation of the string constraint as a quantified expression being based on the parameterized array associated with the string.

12. The computer-readable storage medium of claim 11, wherein the operations further comprise:
eliminating the quantifier through instantiating the quantifier with a symbolic variable; and
determining whether the set of constraints is satisfiable based on the instantiation of the quantifier with the symbolic variable.

13. The computer-readable storage medium of claim 12, wherein the quantifier is an "exists" quantifier.

14. The computer-readable storage medium of claim 12, wherein the quantifier is a "for all" quantifier.

15. The computer-readable storage medium of claim 12, wherein the operations further comprise:
determining an index set for the quantifier based on one or more expressions associated with one or more indices of the quantified expression; and
determining the symbolic variable based on the index set.

16. The computer-readable storage medium of claim 12, wherein the operations further comprise generating a solution of the set of constraints if the set of constraints is satisfiable.

17. The computer-readable storage medium of claim 16, wherein the operations further comprise testing the software module based on the solution of the set of constraints.

18. The computer-readable storage medium of claim 11, wherein the operations further comprise:
determining a dependency of the string constraint with respect to the set of constraints; and
grouping the string constraint with the set of constraints based on the determined dependency.

19. The computer-readable storage medium of claim 11, wherein the operations further comprise:
eliminating the quantifier through recursively unrolling the quantified expression to generate an incremented expression of the string constraint; and
determining whether the set of constraints is satisfiable based on the incremented expression.

20. The computer-readable storage medium of claim 19, wherein the operations further comprise:
generating a solution of the set of constraints if the set of constraints is satisfiable; and
testing the software module based on the solution of the set of constraints.

* * * * *